United States Patent Office 3,503,729
Patented Mar. 31, 1970

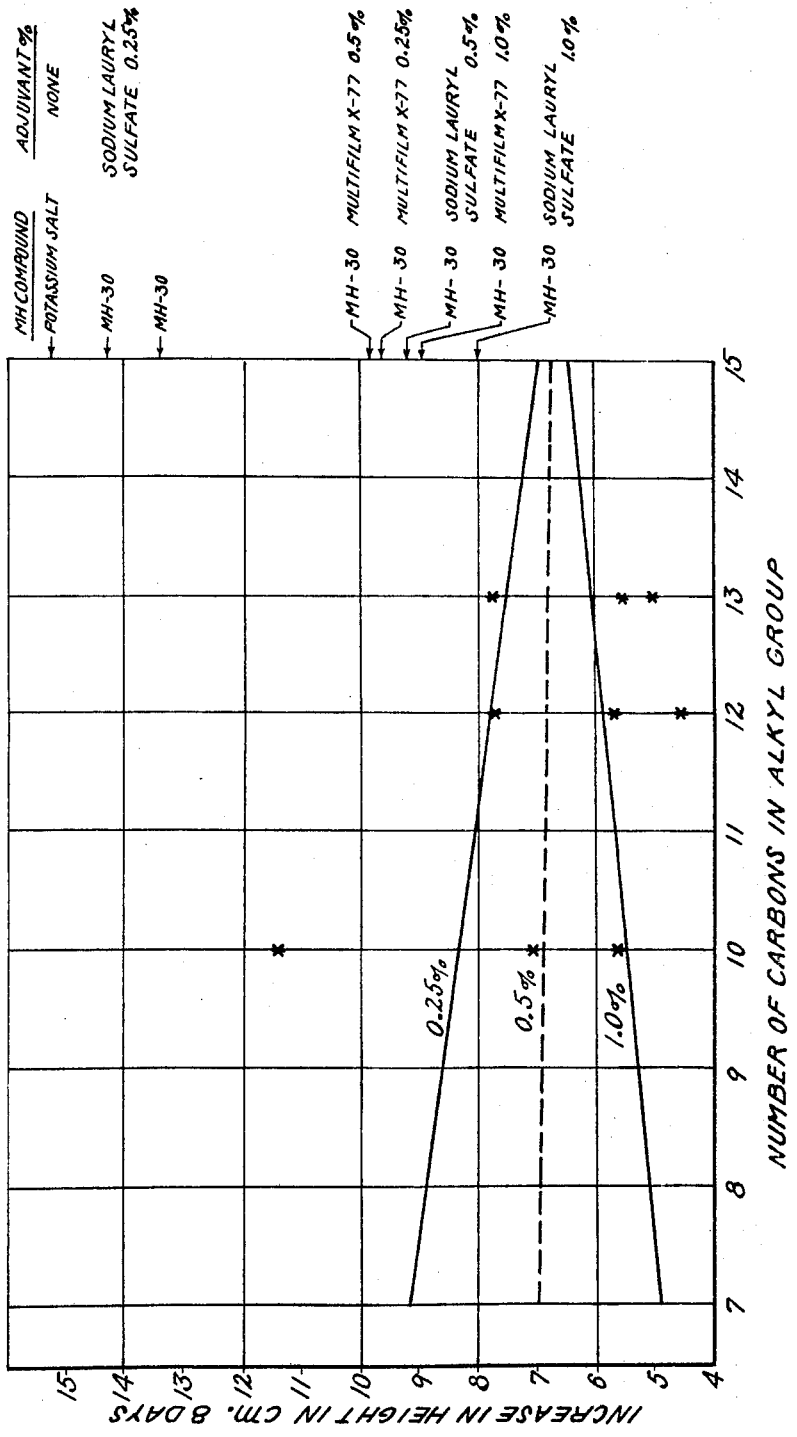

---

3,503,729
6 - HYDROXY - 3 - (2H) - PYRIDAZINONES WITH POLYOXYETHYLENE-BRANCHED CHAIN SURFACTANTS AS PLANT GROWTH REGULANTS
Jack P. Corkins, Porterville, Calif., assignor to Uniroyal, Inc., New York, N.Y., a corporation of New Jersey
Filed Apr. 18, 1966, Ser. No. 543,141
Int. Cl. A01n 5/00, 9/20
U.S. Cl. 71—76                              29 Claims

ABSTRACT OF THE DISCLOSURE

A phytoactive composition which comprises 6-hydroxy-3-(2H)-pyridazinone or its salts and an adjuvant having the formula R—$(OC_2H_4)_n$OH wherein R is a saturated branched aliphatic group having from 4 to 30 carbon atoms and $n$ is from 6 to 25 and the method of using such compositions as plant growth regulants and phytocides.

---

This invention relates to a new improved agricultural composition comprising (1) 6-hydroxy-3-(2H)-pyridazinone, hereinafter referred to as MH, and its salts and (2) a polyoxyethylene-branched alkyl type adjuvant. More particularly, to the use of said composition as plant growth regulants and phytocides.

The phytoactivity of MH and its salts has been described by Hoffman and Schoene, U.S. Patent 2,614,916. Extensive commercial use, field testing, and laboratory evaluation has shown that the phytoactivity of MH and its salts is extremely erratic; particularly under conditions of less than 70% relative humidity and/or a degree of plant stress. Further, it has been widely recognized that even under the more ideal conditions of high humidity and turgid plants, the general efficiency of MH is very low; i.e., amount of MH required in meristematic cells to inhibit growth as compared to the amount of MH that must be applied to the plant to produce phytoactivity.

In accordance with this invention, it has been found that the addition of polyoxyethylene-branched alkyl type adjuvant results in a phytoactive composition far more potent and dependable than previously known materials.

The figure shows an effect of the adjuvants of the invention on the growth of Kanota oats.

Broadly, the adjuvant may be characterized as a compound composed of a polyoxyethylene chain which is terminated by a hydroxyl group at one end and by a saturated branched aliphatic moiety connected to the other end of the polyoxyethylene chain through oxygen. The aliphatic moiety has a branch chained group having from 4 to 30 carbon atoms, preferably an alkyl group having from 8 to 20 carbon atoms and the number of polyoxyethylene units is from 6 to 25, preferably from 8 to 16. Primary and secondary alkyls are most commonly used in the practice of the invention.

Most preferably, the polyoxyethylene type material is an ether which may be represented by the formula:

$$R(OC_2H_4)_nOH$$

wherein R is an alkyl group and $n$ represents the number of polyoxyethylene units as defined previously. Examples of these adjuvants are:

$(CH_3)_2C_3H_5(OC_2H_4)_6OH$;
$(CH_3)_3C_4H_6(OC_2H_4)_8OH$;
$(CH_3)_3C_6H_{10}(OC_2H_4)_9OH$;
$(C_2H_5)_2C_6H_{11}(OC_2H_4)_{10}OH$;
$(CH_3)(C_2H_5)C_7H_{13}(OC_2H_4)_{10}OH$;
$(CH_3)_3C_8H_{14}(OC_2H_4)_{10}OH$;
$(CH_3)_2(C_2H_5)C_{10}H_{18}(OC_2H_4)_{12}OH$;
$(CH_3)_2(C_2H_5)_2C_{14}H_{25}(OC_2H_4)_{18}OH$; and
$(CH_3)_4C_{16}H_{29}(OC_2H_4)_{26}OH$.

The preparation of these materials is well known in the art.

The preferred salts of the 6-hydroxy-3-(2H)-pyridazinone include the alkali metal, ammonium and amine salts, e.g., the alkyl amines and the alkanol amines. These materials must be relatively non-volatile and include the $C_8$ to $C_{18}$ alkyl amines, and the $C_2$ to $C_{10}$ alkanol amines. Specific salts include the potassium, sodium, dodecylamine, ethanolamine, diethanolamine, triethanolamine, and chloine.

Less soluble salts of the polyvalent metals may also be employed, e.g., copper, zinc, calcium, barium, magnesium or iron.

The admixture of the invention may be applied to plants (the term "plants" including plant parts, e.g. seeds) directly, or in an inert medium as a dust in admixture with a powdered solid carrier, such as the various mineral silicates, e.g. mica, talc, pyrophyllite and clays, or as a spray in solution or suspension in water. It may be applied in admixture with small amounts of a wetting agent which may be an anionic surface-active agent, a non-ionic surface-active agent, a cationic surface-active agent or an ampholytic surface-active agent. The two components may also be admixed with powdered solid carriers, such as mineral silicates, together with a small amount of such a surface-active wetting agent so that a wettable powder may be obtained which may be applied directly to plants, or which may be shaken up with water to readily prepare a suspension of the chemical (and powdered carrier) in water for application to plants in that form. The concentration of the chemical in the inert medium depends upon the effect desired, the time of year, the age, species and variety of plant, the climatic conditions, etc.

Reference is made to U.S. Patent 2,614,916 for the various specific surface-active material which can be used, if desired.

While not necessary to the practice of the invention, it is particularly preferable to apply the MH compound and the adjuvant as an aqueous solution or suspension. Generally, from 0.15 to 30% of MH active is present based on the weight of total solution, preferably, from 0.25 to 20%. The particular concentration, however, is only a matter of convenience, the important factor being the amount of MH active deposited on each acre of treated area. The spray is applied so that from ½ to 8 pounds of MH active are distributed on each acre of the treated area. By "MH active" is meant the weight of the 6-hydroxy-3-(2H)-pyridazinone present or, where a salt is employed, the weight of 6-hydroxy-3-(2H)-pyridazinone in said salt.

If the two materials are mixed together, either for application as a dust or for later solutioning, from 0.05 to 10 parts by weight of the adjuvant may be admixed with one part of the MH (compound) preferably from 0.1 to 3 parts per part, and, most desirably from 0.25 to 1.

The adjuvant described may be admixed with the MH as a formulation prior to mixing the final spray solution (or dry formulation) or admixed with a previously formulated MH prior to mixing the final spray solution (or dry material), or the adjuvant may be added before, at the same time, or after the MH is added to the final spray solution (or dry material).

To illustrate more fully the instant invention the following examples are set forth:

EXAMPLE I

Milo plants averaging 2.75 inches in height were treated with 2 pounds, active ingredient basis, of MH–30 (a 30% diethanolamine salt of MH formulated with 1% of sodium lauryl sulfate) per acre. Each treatment was replicated 20 times. The several adjuvants used and the average results are shown in the table below, the numbers in the parenthesis indicate the number of polyoxyethylene units:

TABLE I

| Adjuvant Treatments Concentrations By Weight | Mean Increase in Height in Inches, 32 Days | Percent of Growth Inhibition to Untreated Control |
|---|---|---|
| Untreated Control | 6.36 | 0 |
| 2% Polyoxyethylene (4) n-decyl ether | 3.26 | 48.7 |
| 1% Polyoxyethylene (5) n-decyl ether | 3.00 | 52.8 |
| 2% Sorbitan partial fatty ester | 2.68 | 57.8 |
| 1% Sorbitan partial fatty ester | 2.16 | 66.0 |
| 1% Polyoxyethylene (11) trimethyl decyl ether | 1.03 | 83.8 |
| 2% Polyoxyethylene (11) trimethyl decyl ether | 0.75 | 88.3 |

This experiment was conducted outside under low humidity conditions. The enhancement claimed in this invention is demonstrated by the polyoxyethylene (11) trimethyl decyl ethers whereas the polyoxyethylene linear alkyl ethers and other adjuvants exhibit the commonly known surfactant effect only.

EXAMPLE II

Kanota oats in the two to three leaf stage were treated with 1 pound of active MH per acre and a total volume of 31 gallons per acre. Two commonly used adjuvants were included in the experiment as standards. The treatments and results are shown in the table below:

TABLE II

| Treatments | | | Average Percent of Growth Inhibition to Untreated Check | |
|---|---|---|---|---|
| Type of MH Salt | Concentration by weight, percent | Adjuvants, Type | 7 Days | 14 Days |
| Diethanolamine | None | None | 28.3 | 19.1 |
| Do | 0.25 | Sodium Lauryl Sulfate | 36.0 | 25.6 |
| Do | 0.50 | do | 28.3 | 29.6 |
| Do | 0.25 | Multifilm X-77* | 14.7 | 1.8 |
| Do | 0.50 | do | 33.5 | 24.9 |
| Potassium | 0.25 | Polyoxyethylene (12) trimethyl heptyl ether | 63.4 | 74.2 |
| Do | 0.50 | do | 78.7 | 87.3 |
| Do | 0.25 | Polyoxyethylene (14) trimethyl heptyl ether | 73.6 | 82.4 |
| Do | 0.50 | do | 74.9 | 85.0 |

*A polyoxyethylene nonyl phenol ether formulated with free fatty acids.

This experiment was conducted in the greenhouse under higher humidity conditions than Example I. The enhancement claimed in this invention is demonstrated by the two polyoxyethylene-branched alkyls.

EXAMPLE III

This example illustrates the enhancement with various salts of MH. The MH was applied at a rate of 0.5 pound active per acre in 15 gallons of water per acre. The adjuvants were applied at 0.5% by weight. Greenhouse grown Kanota oats were used as a test plant, 20 replicates per treatment. The average results after 14 days are shown below.

TABLE III

| Treatments | | Mean Increase in Height in Cm. | Percent of Growth Inhibition to Untreated Control |
|---|---|---|---|
| Type MH | Adjuvants | | |
| Diethanolamine | Sodium lauryl sulfate | 24.24 | 5.2 |
| Potassium | Polyoxyethylene (14) trimethyl heptyl ether | 15.90 | 37.8 |
| Diethanolamine | do | 17.08 | 33.2 |
| Potassium | Polyoxyethylene (10) trimethyl nonyl ether | 15.92 | 37.7 |
| Diethanolamine | do | 17.54 | 31.4 |

EXAMPLE IV

Commercial tree, woody shrub, and hedge growth inhibition is commonly accomplished by spraying after the pruning induced regrowth appears with 1⅓ gallons of (4 pounds active) MH–30 per 100 gallons of water. Treatments applied immediately after pruning have not been highly successful. An established Privet hedge was pruned on May 3 and areas, selected by a table of random numbers, were sprayed with various treatments. One group of treatments was applied immediately after pruning and a second group of treatments was applied on May 12 after the pruning induced regrowth was evident. The adjuvants were used at 0.25% by weight. The conditions throughout this experiment were arid. Measurements of the shoot growth (20 per treatment) were made from the pruning cuts 78 days after pruning. The mean results are shown in the following table:

TABLE IV

| Treatment | Pounds, MH/100 Gal. | Adjuvant | Date Treated | Mean Shoot Length in Cm. | Percent of Growth Inhibition to Untreated Control |
|---|---|---|---|---|---|
| A | 4 | None | May 12 | 24.9 | 19.1 |
| B | 4 | Multifilm X-77* | May 3 | 13.8 | 55.2 |
| C | 2 | Polyoxyethylene (11) trimethyl heptyl ether | do | 7.7 | 75.0 |
| D | 4 | Multifilm X-77* | May 12 | 5.9 | 80.8 |
| E | 2 | Polyoxyethylene (11) trimethyl heptyl ether | do | 5.2 | 83.1 |

*See footnote Table II.

Normal surfactant response is demonstrated by the superior results of treatment D as compared to treatment A. Treatment E compared to treatment D demonstrates the enhancement claimed in this invention. Two pounds of MH per 100 gal. with the adjuvant was slightly superior to twice as much MH (4 pounds/100 gal.) with a standard surfactant. Treatment C not only further demonstrates enhancement in terms of the amount of MH required, but also (compared to treatment B) demonstrates additional superior performance by the invention in that excellent growth inhibition was achieved with a one-half MH rate treatment applied immediately after pruning.

EXAMPLE V

A field experiment was conducted in Idaho, under semi-arid conditions, by spraying potato plants (40 gallons per acre) on August 24. A potassium salt formulation containing 20.5% active MH and 10% polyoxyethylene (11) trimethyl heptyl ether was compared at one-half MH rates to standard MH-30 treatments. The potato tubers were harvested October 4th and analyzed for p.p.m. of MH. The results were:

```
                                                          P.p.m.
Untreated _____ 0
MH-30 only (3 lb. active/acre) _____ 20
MH-30 (3 lb. active/acre) plus 1 qt. Multifilm X-
  77 ¹/100 gal. _____ 25
Formulated KMH (1.5 lb. active/acre) _____ 22
```

¹ See footnote Table II.

The tissue analysis for MH used in this experiment is very sensitive. Two-fold enhancement by the product of this invention is demonstrated, i.e., the one-half MH rate formulated with the adjuvant resulted in as much MH in the tubers as the standard treatments.

EXAMPLE VI

Turf grass was sprayed at Bennington, Vt. on June 1. This was a drought season and the conditions were not favorable for good MH growth inhibition response. On August 9 the 4 lb. active/acre MH-30 treatments resulted in 45% growth inhibition, 6 lb. active/acre MH-30 resulted in 73%, 2 lb. active/acre diethanolamine salt of MH plus 1% (w./w.) polyoxyethylene (11) trimethyl heptyl ether resulted in 77% and 3 lb. active diethanolamine salt of MH plus 1% (w./w.) polyexyethylene (11) trimethyl heptyl ether resulted in 87% growth inhibition. The polyoxyethylene (11) trimethyl heptyl ether MH treatments exhibited at least a three-fold increase in activity over the standard MH-30 treatments.

EXAMPLE VII

A field experiment was conducted on milo under high humidity conditions at Sanford, Fla. The average results after 20 days are shown in the following table:

TABLE V

| MH Lb./Acre | Type | Percent of Growth Inhibition to Untreated Control |
|---|---|---|
| 1 | MH-30 | 7.1 |
| 2 | MH-30 | 25.8 |
| ½ | KMH with 0.25% Polyoxyethylene (11) trimethyl heptyl ether | 16.2 |
| 1 | do | 34.7 |

These results demonstrate a two-fold plus enhancement by the invention even under conditions where MH has been found to be most efficient, i.e., high humidity and turgid rapid growing plants.

EXAMPLE VIII

Turning to the attached figure, specific data (averages from 20 replicates illustrated as points on the graph) were submitted to a computer multiple regression least square analysis to estimate the coefficients of a polynomial. The polynomial was used to predict the increase of height (cm.) of Kanota oats eight days after treatment with one pound per acre of the potassium salt of MH containing 0.25%, 0.5% and 1% of polyoxyethylene trimethyl alkyl ethers having alkyl groups containing 4 to 12 carbon atoms and ten polyoxyethylene units.

To obtain the data points, the Kanota oats were grown and maintained in a greenhouse with an air temperature between 70° F. and 90° F. and a relative humidity between 40% and 70%. Treatment took place at the two to three leaf stage by spraying with 31 gallons per acre.

For comparative purposes, the average increase in height after 8 days of plants treated with conventional MH formulation is shown on the right hand side of the graph.

The graph clearly illustrates the effect of varying the number of carbons in the alkyl group of the compounds of the invention and their outstanding efficacy at different concentrations, as compared to the prior art formulations.

EXAMPLE IX

To illustrate the effectiveness of varying the number of polyoxyethylene units Kanota oats were treated as described in Examples II and VIII. In each case the one pound per acre of the potassium salt of MH was used in conjunction with the adjuvant.

TABLE VI

| Adjuvant | Mean Increase in Height After 14 Days, Cm. | Percent of Growth Inhibition to KHM Treated Control |
|---|---|---|
| None | 23.03 | 0 |
| Polyoxyethylene (7) trimethyl heptyl | 13.39 | 41.9 |
| Polyoxyethylene (9) trimethyl heptyl | 11.66 | 49.4 |
| Polyoxyethylene (16½) trimethyl heptyl | 11.42 | 50.4 |

The above results show the effectiveness of the adjuvant over a broad range of polyoxyethylene units.

EXAMPLE X

The advantage of branching in the alkyl group is demonstrated by this experiment conducted on Kanota oats in the manner described in Examples II and VIII. The adjuvants were used at a concentration of 0.48%.

TABLE VII

| Treatments | Average Percent of Growth Inhibition to Untreated Control | |
|---|---|---|
| | 8 Days, 1 lb. MH/a.—31 g.p.a. | 16 Days, ⅓ lb. MH/a.—15 g.p.a. |
| (A) KHM with Linear Alkyl | 21.5 | 10.0 |
| (B) KHM with Branched Alkyl | 50.7 | 55.8 |
| (C) MH-30 plus Multifilm X-77* | 28.5 | 16.7 |

* See footnote Table II.

Treatments (A) and (B) were with polyoxyethylene (12) alkyl ethers; both alkyl groups containing 12 carbons. The trimethyl nonyl ether (branched alkyl—Treatment (B)) was superior to both the dodecyl ether (linear alkyl—Treatment (A)) and the standard adjuvant Treatment (C). The advantage of the branched alkyl in this invention is demonstrated by direct comparison with the linear alkyl.

EXAMPLE XI

Most of the previous examples involved the invention used with the potassium salt of MH. This experiment was conducted on Kanota oats in the manner described in Examples II and VIII. The adjuvants were used at a concentration of 0.5% and the MH was applied at 1 pound active/acre. The average results shown are at 14 days after treatment.

Table VIII

Treatments: Percent of growth inhibition to untreated control
(A) Potassium salt with polyoxyethylene (10) trimethyl alkyl ether _____ 34.0
(B) Diethanol amine salt with polyoxyethylene (10) trimethyl alkyl ether _____ 34.1
(C) Choline salt with polyoxyethylene (10) trimethyl alkyl ether _____ 41.2
(D) Diethanol amine salt with sodium lauryl sulfate _____ +1.0

The superiority of the invention over a standard adjuvant and the uniform response of the invention with three different salts of MH are both demonstrated.

Having thus described my invention, what I claim and desire to protect by Letters Patent is:

1. A plan growth inhibiting composition consisting essentially of (1) at least a plant growth inhibiting amount of 6-hydroxy-3-(2H)-pyridazinone or its alkali metal salts, non-halogenated ammonium salts, $C_8$ to $C_{18}$ alkyl amine salts, $C_2$ to $C_{10}$ alkanol amine salts, or soluble polyvalent metal salts wherein the metal is copper, zinc, calcium, barium, magnesium, or iron and (2) an adjuvant having the formula:

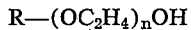

wherein R is a saturated branched aliphatic group having from 4 to 30 carbon atoms and $n$ is an integer from 6 to 25.

2. The composition of claim 1 wherein from 0.05 to 10 parts by weight of said adjuvant are present for each part of the 6-hydroxy-3-(2H)-pyridazinone or its salt.

3. The composition of claim 1 wherein R is a branched alkyl group having from 8 to 20 carbon atoms and $n$ is from 8 to 16.

4. The composition of claim 1 wherein R is a trimethyl alkyl group having from 8 to 20 carbon atoms and $n$ is from 10 to 12.

5. The composition of claim 1 wherein the adjuvant is polyoxyethylene trimethylnonyl ether, said polyoxyethylene group having 10 oxyethylene units.

6. The composition of claim 1 wherein the adjuvant is polyoxyethylene trimethylheptyl ether, said polyoxyethylene group having 14 oxyethylene units.

7. The composition of claim 1 wherein the adjuvant is a polyoxyethylene trimethyldecyl ether, said polyoxyethylene group having 11 oxyethylene units.

8. The composition of claim 1 which comprises one part of the diethanolamine salt of 6-hydroxy-3-(2H)-pyridazine and 0.1 part to 3 parts by weight of said adjuvant, R being a branched alkyl group having from 8 to 20 carbon atoms and $n$ being from 8 to 16.

9. The composition of claim 1 which comprises one part of the potassium salt of 6-hydroxy-3-(2H)-pyridazine and 0.1 part to 3 parts by weight of said adjuvant, R being a branched alkyl group having from 8 to 20 carbon atoms and $n$ being from 8 to 16.

10. The composition of claim 1 wherein the pyridazinone is in the form of an ammonium salt, this ammonium salt being the choline salt.

11. The composition of claim 1 wherein the 6-hydroxy-3-(2H)-pyridazinone is in the form of its potassium salt and wherein for the adjuvant R is trimethylnonyl and $n$ is 10.

12. An aqueous mixture for inhibiting plant growth consisting essentially of (1) at least a plant growth inhibiting amount of 6-hydroxy-3-(2H)-pyridazinone or its alkali metal salts, non-halogenated ammonium salts, $C_8$ to $C_{18}$ alkyl amine salts, $C_2$ to $C_{10}$ alkanol amine salts, or soluble polyvalent metal salts wherein the metal is copper, zinc, calcium, barium, magnesium, or iron and (2) an adjuvant having the formula:

wherein R is a saturated branched aliphatic group having from 4 to 30 carbon atoms and $n$ is an integer from 6 to 25.

13. The aqueous mixture of claim 12 wherein R is a branched alkyl group having from 8 to 20 carbon atoms and $n$ is from 8 to 16.

14. The aqueous mixture of claim 12 wherein R is a trimethyl alkyl group having from 8 to 20 carbon atoms and $n$ is from 10 to 12.

15. The aqueous mixture of claim 12 wherein the adjuvant is polyoxyethylene trimethylnonyl ether, said polyoxyethylene group having 10 oxyethylene units.

16. The aqueous mixture of claim 12 wherein the adjuvant is polyoxyethylene trimethylheptyl ether, said polyoxyethylene group having 14 oxyethylene units.

17. The aqueous mixture of claim 12 wherein the adjuvant is a polyoxyethylene trimethyldecyl ether, said polyoxyethylene group having 11 oxyethylene units.

18. The aqueous mixture of claim 12 which comprises 0.25 to 20%, based on the weight of total mixture, of the diethanolamine salt of 6-hydroxy-3-(2H)-pyridazine and 0.1 part to 3 parts by weight of said adjuvant for each part of said diethanolamine salt, R being a branched alkyl group having from 8 to 20 carbon atoms and $n$ being from 8 to 16.

19. The aqueous mixture of claim 12 which comprises 0.25 to 20%, based on the weight of the total mixture, of the potassium salt of 6-hydroxy-3-(2H)-pyridazine and 0.1 part to 3 parts by weight of said adjuvant for each part of said potassium salt, R being a branched alkyl group having from 8 to 20 carbon atoms and $n$ being from 8 to 16.

20. The aqueous mixture of claim 12 wherein the 6-hydroxy-3-(2H)-pyridazinone is in the form of its potassium salt and wherein for the adjuvant R is trimethylnonyl and $n$ is 10.

21. A method of regulating plant growth which comprises treating growing plants with a mixture consisting essentially of (1) at least a plant growth inhibiting amount of 6-hydroxy-3-(2H)-pyridazinone or its alkali metal salts, non-halogenated ammonium salts, $C_8$ to $C_{18}$ alkyl amine salts, $C_2$ to $C_{10}$ alkanol amine salts, or soluble polyvalent metal salts wherein the metal is copper, zinc, calcium, barium, magnesium, or iron and (2) and adjuvant having the formula:

$$R\text{---}(OC_2H_4)_nOH$$

wherein R is a saturated branched aliphatic group having from 4 to 30 carbon atoms and $n$ is an integer from 6 to 25.

22. The method of claim 21 wherein R is a branched alkyl group having from 8 to 20 carbon atoms and $n$ is from 8 to 16.

23. The method of claim 21 wherein R is a trimethyl alkyl group having from 8 to 20 carbon atoms and $n$ is from 10 to 12.

24. The method of claim 21 wherein the adjuvant is polyoxyethylene trimethylnonyl ether, said polyoxyethylene group having 10 oxyethylene units.

25. The method of claim 21 wherein the adjuvant is polyoxyethylene trimethylheptyl ether, said polyoxyethylene group having 14 oxyethylene units.

26. The method of claim 21 wherein the adjuvant is a polyoxyethylene trimethyldecyl ether, said polyoxyethylene group having 11 oxyethylene units.

27. The method of claim 21 wherein said plants are treated with one part of the diethanolamine salt of 6-hydroxy-3-(2H)-pyridazine and 0.1 part to 3 parts by weight of said adjuvant, R being a branched alkyl group having from 8 to 20 carbon atoms and $n$ being from 8 to 16.

28. The method of claim 21 wherein said plant is treated with one part of the potassium salt of 6-hydroxy-3-(2H)-pyridazine and 0.1 part to 3 parts by weight of said adjuvant, R being a branched alkyl group having from 8 to 20 carbon atoms and $n$ being from 8 to 16.

29. The method of claim 21 wherein the 6-hydroxy-3-(2H)-pyridazinone is employed in the form of its potassium salt and wherein for the adjuvant R is trimethylnonyl and $n$ is 10.

References Cited

UNITED STATES PATENTS

| | | | |
|---|---|---|---|
| 2,614,916 | 10/1952 | Hoffmann et al. | 71—92 |
| 2,637,701 | 5/1953 | Doerr | 252—351 |
| 2,905,720 | 9/1959 | De Benneville et al. | 252—351 |
| 3,281,475 | 10/1966 | Boettner et al. | 252—351 |

OTHER REFERENCES

Jansen et al., "Effects of surfactants on the herbicidal activity of several herbicides in aqueous spray systems," Weeds, vol. 9, No. 3, (1961) pp. 281–84, 390–392, 400, 404–405.

Jansen, "Surfactant enhancement of herbicide entry," Weeds, vol. 12, No. 4, pp. 251–55 (1964).

Temple et al., "The effect of surfactants, etc." Weeds, vol. 11, No. 4, pp. 297–300 (1963).

LEWIS GOTTS, Primary Examiner

G. HOLLRAH, Assistant Examiner

U.S. Cl. X.R.

71—92, 124; 260—615

UNITED STATES PATENT OFFICE
CERTIFICATE OF CORRECTION

Patent No. 3,503,729          Dated March 31, 1970

Inventor(s) JACK P. CORKINS

It is certified that error appears in the above-identified patent and that said Letters Patent are hereby corrected as shown below:

Column 2, line 18: Before "ammonium" insert -- non-halogenated --; line 24: "chloine" should read -- choline --. Column 4, line 64: After "water" change the comma (,) to a period (.). Column 7, lines 14 and 15, Table VII: In each instance, "KHM" should read -- KMH --; line 52: "A plan" should read -- A plant --; line 71: "methy lalkyl" should read -- methyl alkyl --. Column 9, line 2: After "(2)" change "and" to -- an --.

SIGNED AND SEALED
SEP 15 1970

(SEAL)
Attest:

Edward M. Fletcher, Jr.
Attesting Officer

WILLIAM E. SCHUYLER, JR.
Commissioner of Patents